United States Patent Office 3,494,127
Patented Feb. 10, 1970

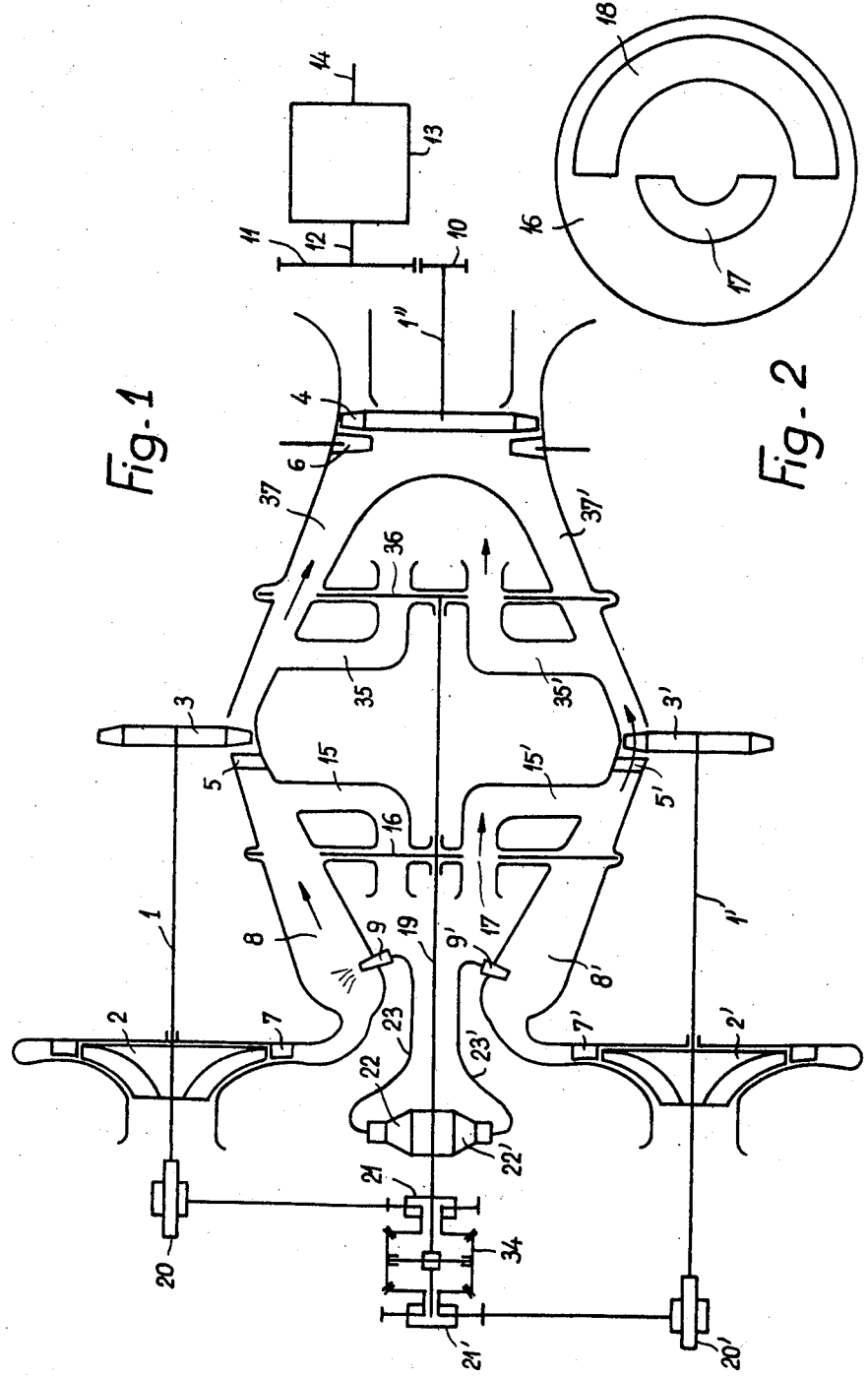

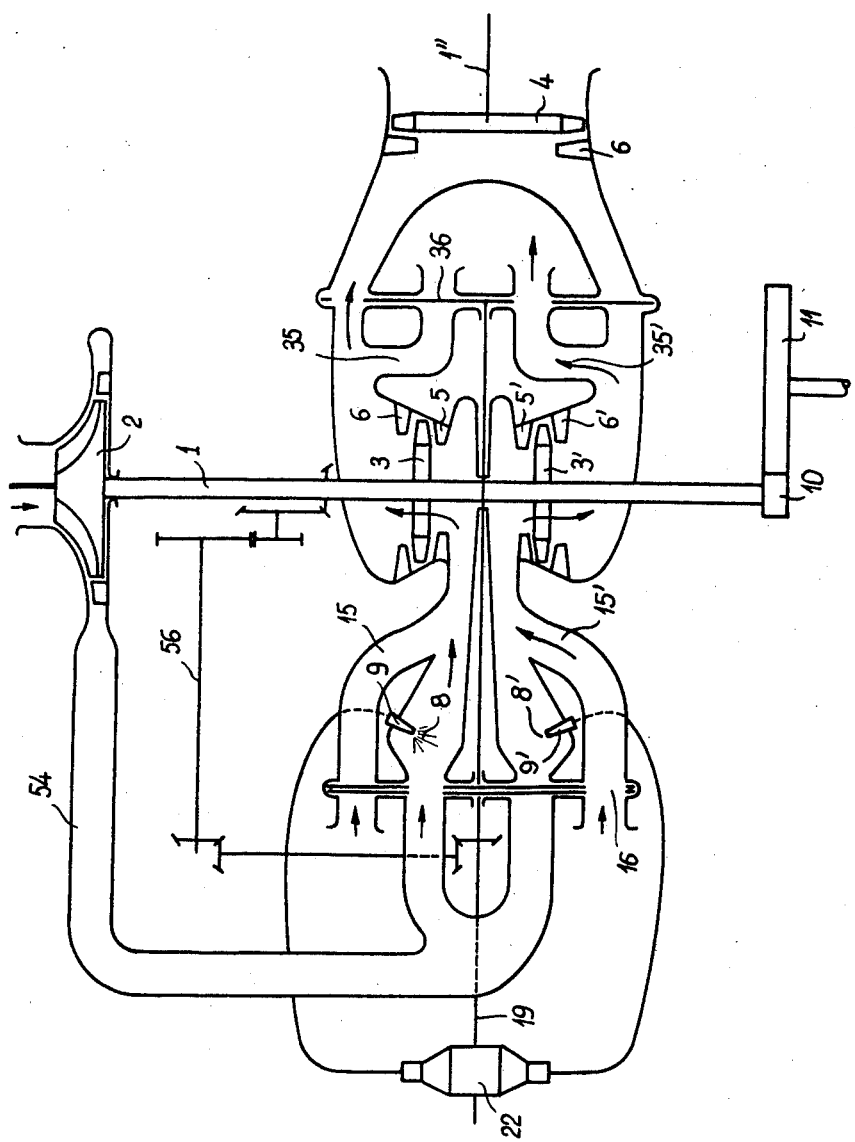

3,494,127
GAS TURBINE COMPRISING EXPANSION AND SCAVENGING CYCLES
Maurice G. Brille, Billancourt, France, assignor to Regie Nationale des Usines Renault, Billancourt, and Automobiles Peugeot, Paris, France
Filed Feb. 23, 1968, Ser. No. 707,651
Claims priority, application France, Mar. 8, 1967, 97,916
Int. Cl. F02c 1/06, 7/02, 7/12
U.S. Cl. 60—39.16          3 Claims

ABSTRACT OF THE DISCLOSURE

Gas turbine operating according to a two-cycle process, which comprises an expansion cycle and a scavenging or cooling cycle, characterised in that the scavenging flow is exhausted to the outside before attaining the turbo-engine wheel or wheels for driving the power shaft, so that the scavenging or cooling flow is directed only towards the wheels driving the compressor or compressors, and that only power flow can be directed continuously or nearly continuously through said driving wheels.

---

This invention relates in general to gas turbines and has specific reference to a gas turbine comprising a compression chamber and a compressor, operating according to the two-cycle process.

In a prior U.S. patent application Ser. No. 702,744 filed on Feb. 2, 1968, the applicant described a gas turbine in which the expansion flow is discontinued periodically to permit the delivery of a flux of scavenging or cooling air.

According to this arrangement, at the turbine outlet, whether the turbine has a single shaft or two shafts, the expansion or power flow follows the same path as the scavenging or cooling flow before being exhausted to the outside.

This invention is concerned more particularly with a gas turbine in which the scavenging or cooling flow is rejected to the outside before attaining the turbine wheel or wheels driving the power shaft, for example for driving a vehicle, so that the aforesaid scavenging or cooling flow is effective only for the wheels driving the compressor or compressors, and the power or expansion flow can take place continuously or almost continuously through the power wheels of the machine.

According to a specific form of embodiment, this invention consists in providing a gas turbine having a turbo-engine section comprising one or more power wheels driving the power shaft of the vehicle, and two turbo-compressor units each adapted to receive the corresponding driving flow from a special combustion chamber, each combustion chamber being fed from the air compressor of the relevant turbo-compressor, and duct means or passages directing the power flow from the combusion chambers to the wheels of said turbo-compressors and subsequently to the turbo-engine wheels, these passages or ducts comprising air inlets disposed upstream of the turbo-compressor wheels, and air outlets disposed downstream of these wheels, said passages, inlets and outlets being alternatively open or closed by rotary distributors disposed respectively upstream and downstream of said turbo-compressor wheels in order to cause the power or expansion flow and the scavenging or cooling flow to act alternatively on these wheels, and to direct only the power flow through said turbo-engine wheels.

A clearer understanding of this invention will be had from the following description referring to the accompanying diagrammatic drawing illustrating by way of example a turbine constructed according to the teachings of this invention. In the drawing:

FIGURE 1 is a diagrammatic view of the turbine assembly;
FIGURE 2 is a detail cross-sectional and very diagrammatical view of a distributor;
FIGURE 3 is a diagrammatic view showing a modified form of embodiment of the turbine with a single compressor.

Referring first to FIGURE 1, the assembly comprises shafts 1 and 1' on which the compressors 2 and 2' are mounted together with the wheels 3 and 3' driving these compressors, with their guide vanes or fixed buckets 5 and 5'.

The wheel or wheels 4 of the power turbine which cooperate with the buckets or vanes 6 is or are mounted on a separate shaft 1" having mounted at its outer end a reduction gearing comprising toothed wheels 10 and 11, the latter being mounted on a shaft 12 revolving at a lower speed and transmitting the torque to a variable-speed mechanism 13 (not described in detail) and, beyond this mechanism, to the shaft 14 propelling the vehicle.

The compressor diffusers are designated by the reference numerals 7 and 7', the combustion chambers being denoted 8 and 8', and burners 9 and 9'.

The driving wheels 3 and 3' are alternately fed with gas respectively from the combustion chambers 8 and 8', and supplied with scavenging or cooling air taken from the outside, filtered and directed via branch ducts or passages 15 and 15'. A distributor 16 (FIGURE 2) consisting of a disk in which semi-circular apertures 17 and 18 are formed, permits the flow therethrough either of combustion gas from combustion chamber 8—and in this case it blocks the branch duct or passage—or of atmospheric air—and in this case it blocks the combustion chamber.

This distributor is carried by a shaft 19 having the chambers 8, 8' and the branch ducts or passages 15, 15' disposed symmetrically thereto.

On the output side of the driving wheels 3 and 3' another pair of branch ducts or passages 35 and 35' are provided whereby a distributor 36 identical with distributor 16 and mounted on a common shaft 19, can release the scavenging or cooling air directly to the external atmosphere, as contrasted with the combustion gases having passed through the driving wheels 3 and 3' which are directed by ducts 37 and 37' towards the power wheel 4, so that this wheel 4 receives continuously or nearly continuously the gaseous flow propelled by turns by the wheels 3 and 3'.

These driving wheels 3 and 3', and the guide vanes 5 and 5' associated therewith are so arranged that the gaseous flow emerging therefrom still has a certain pressure used in the power wheel for producing the torque necessary for propelling the vehicle. The turbo-engine wheel or wheels may be provided with variable-inclination buckets in order to adhere as much as possible to a proper regulation.

The shaft 19 driving the two distributors 16 and 36 also drives the two fuel pumps 22 and 22'; this shaft 19 is driven in turn from the compressor shafts 1 and 1' through a differential 34 driven through a high-reduction gearing 20 and 21, on the one hand, and another high-reduction gearing 20' and 21', on the other hand, so that the shaft 19 revolves at a speed corresponding to one-half of the sum of the speeds of shafts 1 and 1'.

The diagram shows the distributors 16 and 36 in the position corresponding to the combustion cycle in chamber 8. The gases produced by the fuel combustion in this chamber are thus directed towards the driving wheel 3 and then towards the power wheel 4. The chamber 8' is then inoperative and closed by distributor 16 which on the other hand opens the cooling or scavenging air inlet 15'; this air is sucked and cooled by the driving wheel 3', and subsequently exhausted through the branch duct or passage 35' of which the outlet is open by the distributor 36.

During the next cycle as the distributors 16 and 36 have accomplished a half-revolution, the circuits are reversed and the power turbine 4 is now fed with combustion gases from chamber 8'.

It will be noted that only hot air can escape through the branch ducts or passages 35 and 35', except in principle, exhaust gas which may be used for various purposes, for example for heating a vehicle.

As shown in FIGURE 3, the driving wheels 3 and 3' are mounted on the driving shaft 1 of the single compressor; this compressor is adapted alternately to feed through distributor 16 the chambers 8 and 8'; the gases having passed through the wheels 3 or 3' drive the power wheel 4 mounted on the separate shaft 1" driving the vehicle; inlets 15 and 15' the opening of which is controlled by the same distributor 16 for alternately permitting the ingress of the scavenging or cooling flow exhausted through the outlets 35 or 35' open by turns by the distributor 36.

What is claimed is:

1. A two cycle gas turbine having a power cycle and a scavenging cycle comprising a turbo-engine having combustion chamber means, a turbo-engine output wheel driving a power shaft, duct means connected between said chamber means and said output wheel, distributor means alternating gaseous flow from atmosphere and said combustion chamber means to said duct means and from said duct means to said output wheel and to atmosphere, turbo-compressor means operatively connected to feed said combustion chamber means, compressor power wheel means in said duct operatively connected to drive said compressor means whereby said scavenging cycle gaseous flow is directed to atmosphere before striking the turbo-engine output wheel so that the scavenging flow can act only on the compressor power wheel means and the combustion gases can flow through the output wheel.

2. A two cycle gas turbine according to claim 1 wherein said combustion chamber means comprises at least two combustion chambers, said turbo-compressor means comprising at least two turbo-compressor power wheels each adapted to receive power flow from a specific combustion chamber, said duct means comprising two ducts directing the combustion gases respectively from the said two combustion chambers to the respective turbo-compressor power wheels and then to the turbo-engine output wheel, each said duct means comprising an air inlet disposed upstream of said turbo-compressor power wheels and an air outlet disposed downstream of said turbo-compressor power wheels, distributor means disposed in said ducts upstream and downstream of said turbo-compressor power wheels to alternately open and close said ducts so as to cause said turbo-compressor power wheels to alternately be driven by the combustion gas flow and scavenging flow and to cause said turbo-engine wheel to receive only power flow therethrough from alternate ones of said duct means.

3. A two cycle gas turbine according to claim 1 wherein said turbo-compressor means comprises a single turbo-compressor means having two power wheels and said chamber means comprises two combustion chambers, said power wheels receiving combustion gas flow alternately from one of said two combustion chambers, said combustion chambers being alternately supplied by said compressor means, said duct means directing flow from said combustion chambers simultaneously to the compressor power wheels and subsequently to the turbo-engine output wheel, said ducts comprising air inlets upstream of said compressor power wheels and air outlets downstream of said compressor power wheels so that the combustion gas flow and the scavenging flow are caused to alternately pass through said power wheels and that only combustion gas flow can take place through said turbo-engine output wheel.

References Cited

UNITED STATES PATENTS

| | | | |
|---|---|---|---|
| 2,579,321 | 12/1951 | Kadenacy | 60—39.39 |
| 2,660,858 | 12/1953 | Lichty | 60—39.19 |
| 2,928,242 | 3/1960 | Guenther | 60—39.39 |

MARK NEWMAN, Primary Examiner

A. D. HERRMAN, Assistant Examiner

U.S. Cl. X.R.
60—39.39, 39.43, 39.66